Patented Mar. 19, 1929.

1,705,840

UNITED STATES PATENT OFFICE.

OSKAR SPENGLER AND RUDOLF WEIDENHAGEN, OF DESSAU IN ANHALT, GERMANY, ASSIGNORS, BY MESNE ASSIGNMENTS, TO GRASSELLI DYESTUFF CORPORATION, OF NEW YORK, N. Y., A CORPORATION OF DELAWARE.

SULPHUR DYES.

No Drawing. Application filed October 31, 1925, Serial No. 66,069, and in Germany January 10, 1925.

This invention relates to new sulphur dyes of excellent fastness. These dyes are in the dry shape dark powder soluble in warm concentrated sulphuric acid with a reddish violet colour and soluble in an aqueous solution of sodium sulphide with a yellow to brown colour, from which solution cotton is dyed blackish brown tints and may be obtained by melting together sulphur and a leucoindophenol, in which the hydrogen of the terminal amino-group has been exchanged for a group such as methylene, benzyl, benzal, an acyl group or in other words derivatives of leucoindophenol which have a tendency to undergo thiazole ring closure on heating with sulphur.

Unlike the indophenols in which alkyl groups have been substituted for the hydrogen of the amino group, compounds of the above constitution can not be converted into useful sulphur dyes by boiling them with polysulphide. A process has been described for the manufacture of dyes, dyeing cotton in an alkali sulphide bath, by heating with polysulphides a methylene-, nitro-, amino- or hydroxy-benzylidine-amino compound, but this process cannot be applied to substituted indophenols having the constitution first mentioned. The products are only feebly dyeing dyes of tints which are of no importance. It is, therefore, surprising that compounds still retaining the full properties of indophenols should yield by the process of baking with sulphur, normal dyes which are of notable fastness.

It is not necessary to use the previously formed compounds mentioned above, one may use as well components of these compounds, the condensation being produced at once or by the baking process.

The following examples, the parts being by weight, illustrate the invention without limiting it:

1. To 15 parts of 4-amino-4'-hydroxydiphenylamine are added 10 parts of benzaldehyde. The mixture solidifies immediately, the benzal compound being formed. 60 parts of sulphur are added and the mass is baked at 200° C. for 10 hours. The crude melt is dissolved in aqueous sodium disulphide solution and the dyestuff is precipitated by passing a current of air through the solution. It dyes cotton in an alkali sulphide bath dark brown tints of remarkable fastness to soap, boiling and acid, and also of a fastness to chlorine which is remarkable in a sulphur dye. The structural formula of the benzal compound of the 4-amino-4'-hydroxydiphenylamine is:

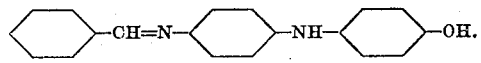

2. Benzoylchloride is substituted for the benzaldehyde prescribed in Example 1. There is obtained equally easily a sulphur dye of similar properties. The structural formula of the intermediate product of this example is as follows:

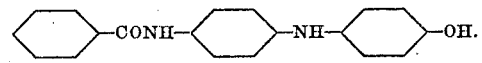

3. The equivalent quantity of acetic anhydride is substituted for the benzaldehyde prescribed, in Example 1. A sulphur dye of similar tint and properties is obtained. The structural formula of the intermediate product of this example is as follows:

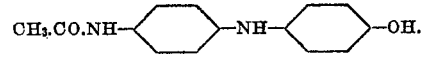

What we claim is:—

1. The new sulphur dyes being in the dry shape dark powders soluble in warm concentrated sulphuric acid with a reddish violet colour and soluble in an aqueous solution of sodium sulphide with a yellow to brown colour from which solution cotton is dyed blackish brown tints, these dyes being thiazole derivatives obtainable by melting together sulphur and a leucoindophenol, in which the hydrogen of the terminal amino group has been exchanged for an organic radicle, the leucoindophenol derivative being able to undergo thiazole ring closure on heating with sulphur.

2. The new sulphur dyes being in the dry shape dark powders soluble in warm concentrated sulphuric acid with a reddish violet colour and soluble in an aqueous solution of sodium sulphide with a yellow to brown colour, from which solution cotton is dyed blackish brown tints, these dyes being thiazole derivatives obtainable by melting together sulphur and a leucoindophenol, in which the hydrogen of the terminal amino group has been exchanged for an organic substituent so that the compound may be considered as a derivative of a leucoindophenol and of an oxo-compound.

3. The new sulphur dyes being in the dry shape dark powders soluble in warm concentrated sulphuric acid with a reddish violet colour and soluble in an aqueous solution of sodium sulphide with a yellow to brown colour, from which solution cotton is dyed blackish brown tints, these dyes being obtainable by melting together sulphur and a leucoindophenol in which the hydrogen of the terminal amino group has been exchanged for the radicle of an aldehyde.

4. The new sulphur dye being in the dry shape a dark powder soluble in warm concentrated sulphuric acid with a reddish violet colour and soluble in an aqueous solution of sodium sulphide with a yellow to brown colour, from which solution cotton is dyed blackish brown tints, the dye being obtainable by melting together sulphur and 4-benzalamino-4'-hydroxydiphenylamine.

In testimony whereof we affix our signatures.

OSKAR SPENGLER.
RUDOLF WEIDENHAGEN.